United States Patent [19]

Schalk

[11] Patent Number: 4,867,051
[45] Date of Patent: Sep. 19, 1989

[54] BARBEQUE GRILL APPARATUS

[76] Inventor: Frederick C. Schalk, 9730 W. Twp. Rd. 108, New Riegel, Ohio 44853

[21] Appl. No.: 261,724

[22] Filed: Oct. 24, 1988

[51] Int. Cl.$^4$ .............................................. A23L 3/04
[52] U.S. Cl. .................................. 99/443 C; 99/444; 99/421 P; 99/448; 99/446; 198/797
[58] Field of Search .................. 99/444, 446, 448, 450, 99/421 H, 421 P, 421 R, 443 C; 198/797

[56] References Cited

U.S. PATENT DOCUMENTS

| | | | |
|---|---|---|---|
| 1,294,591 | 2/1919 | Young | 198/797 |
| 1,391,157 | 9/1921 | Wundrack | 99/443 C |
| 2,790,380 | 4/1957 | Shryack | 99/448 X |
| 3,232,247 | 2/1966 | Vaughan | 99/421 P |
| 3,267,924 | 8/1966 | Payne | 99/446 X |
| 3,295,434 | 1/1967 | Wilhelm et al. | 99/443 C X |
| 3,327,616 | 6/1967 | Ozymy | 99/446 X |
| 3,372,636 | 3/1968 | Marasco | 99/427 |
| 3,648,010 | 3/1972 | Schier | 99/427 |
| 3,802,331 | 4/1974 | Zickefoose | 99/427 |
| 4,184,420 | 1/1980 | Podaras et al. | 99/427 |
| 4,470,343 | 9/1984 | Didier | 99/446 X |

FOREIGN PATENT DOCUMENTS

| | | | |
|---|---|---|---|
| 17728 | 6/1904 | Sweden | 198/797 |
| 607754 | 5/1978 | U.S.S.R. | 198/797 |

Primary Examiner—Stephen Marcus
Assistant Examiner—Christine A. Peterson
Attorney, Agent, or Firm—Henderson & Sturm

[57] ABSTRACT

A barbeque grill apparatus having a container with a curved bottom, two sides connected to the bottom and two ends interconnecting the bottom and the sides. A shaft is rotatably attached to a top portion of the container and a plurality of arms extend radially outwardly therefrom. The arms each have a grill attached thereto in such a manner that when the shaft is rotated, each of the new grills will maintain a horizontal orientation. A source of heat is disposed in the container but to one side of the lowest portion of the bottom of the container so that grease dripping into the container will not accumulate directly over the flame, to thereby prevent burning of such grease.

6 Claims, 2 Drawing Sheets

BARBEQUE GRILL APPARATUS

TECHNICAL FIELD

The present invention relates generally to barbeque grills and more particularly to a barbeque grill having grills therein which rotate in a circular fashion so the position of the food being grilled constantly changes with respect to the source of heat.

BACKGROUND ART

Barbeque grills typically have a grate with a source of heat thereunder such as charcoal or propane or natural gas burners under a bed of lava rock. Most grills also have a lid.

One problem associated with typical barbeque grills is that sometimes the food will burn because the heat is always at the same place underneath such food. This problem is compounded when meats having grease therein is cooked because the grease within the meat will melt and such grease will then drip down onto the hot coals or flame causing the flames to flare up and engulf the food being cooked inside of these flames.

Structures have been devised to keep the food moving with respect to the flame, such as U.S. Pat. No. 3,372,636 to Marasco, but no one to-date has solved the problem of grease dripping down onto the fire causing flames which tend to burn the food.

Also because of the intense heat directed at the food on the grill, it is very difficult to prepare more than one type of food, for example enough that would constitute an entire meal, by using only a grill.

Accordingly, there exists a need for a barbeque grill structure which will overcome the aforementioned problems.

DISCLOSURE OF THE INVENTION

The present invention relates generally to a barbeque grill apparatus having a container with a curved bottom, two sides connected to the bottom and two ends interconnecting the bottom and the sides. The lowest portion of the bottom is near the center thereof. A shaft is rotatably attached to a top portion of the container and a plurality of arms extend radially outwardly therefrom. These arms each have a grill attached thereto in such a manner that when the shaft is rotated, each of the grills will maintain a horizontal orientation. A source of heat is disposed in the container but to one side of the bottom center of the container so that grease dripping into the container will not accumulate directly over the flame, to thereby prevent burning of the grease.

An object of the present invention is to provide an improved barbeque grill apparatus.

Another object of the present invention is to provide a barbeque grill apparatus which prevents grease fires.

A further object of the present invention is to provide a barbeque grill apparatus which requires less attention to the food, making it necessary to turn the food less in order to prevent burning.

A still further object of the present invention is to provide an apparatus wherein an entire meal can be prepared using interchangeable grill racks and casserole pans.

A still further object of the present invention is to provide a barbeque grill apparatus which cooks the food at a constant temperature and which can also be used to keep food warm after the cooking process is completed.

Other objects, advantages, and novel features of the present invention will become apparent from the following detailed description of the invention when considered in conjunction with the accompanying drawings.

BEST MODE FOR CARRYING OUT THE INVENTION

Figure 1:
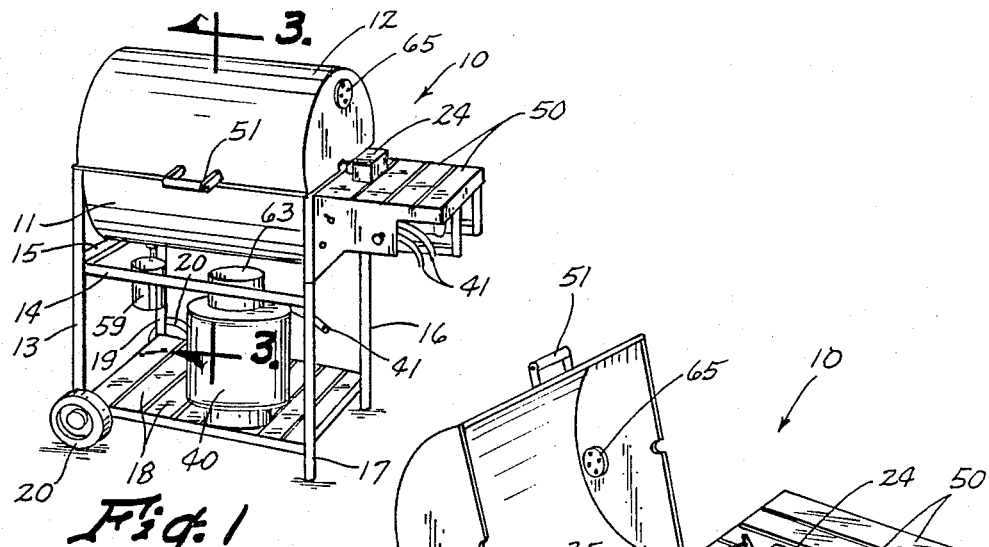
FIG. 1 is a perspective view of a preferred embodiment of the present invention.

Referring now to the drawings wherein like reference numerals designate identical or corresponding parts throughout the several views, FIG. 1 shows a barbeque grill apparatus (10) constructed in accordance with the present invention.

The barbeque grill (10) includes a container (11) having a lid (12) pivotally attached thereto. The container (11) is disposed on a cart comprised of structural elements (13), (14), (15), (16), (17), (18) and (19). Wheels (20) are rotatably attached to one end of the platform (18) of the cart.

Figure 3:
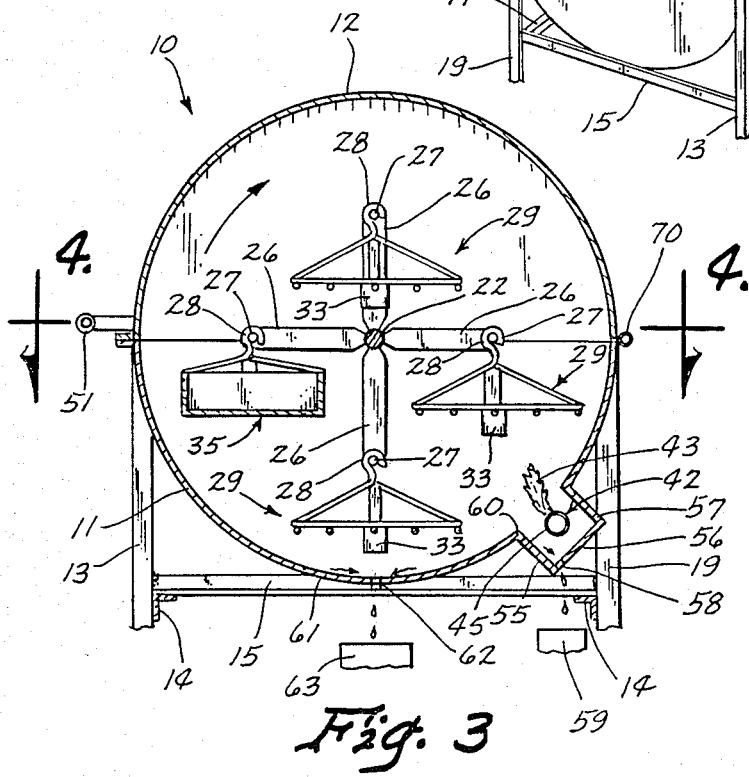
FIG. 3 is a cross-sectional view taken along line 3—3 of FIG. 1.
Figure 4:
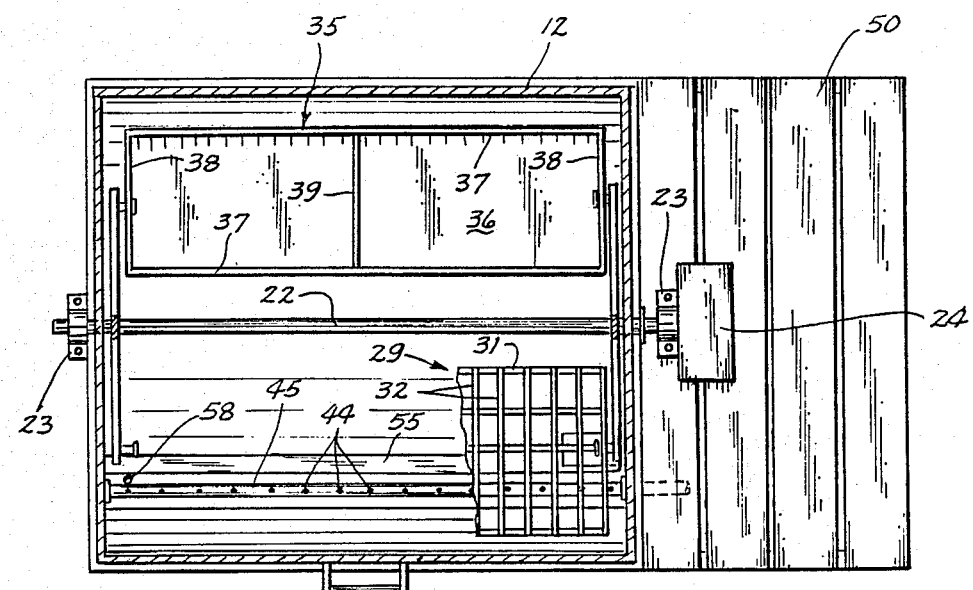
FIG. 4 is an enlarged cross-sectional view taken along line 4—4 of FIG. 3 with a portion of one of the grills broken away to show a gas burner beneath it.

Referring to FIG. 3, a shaft (22) is rotatably attached by a bearing (23) at one end and an electric motor housing (24) and another bearing (23) at the other end to the container (11). A plurality of radially extending arms (26) have pins (27) extending therefrom to receive hook members (28) on grill assemblies (29).

Figures 5, 6:
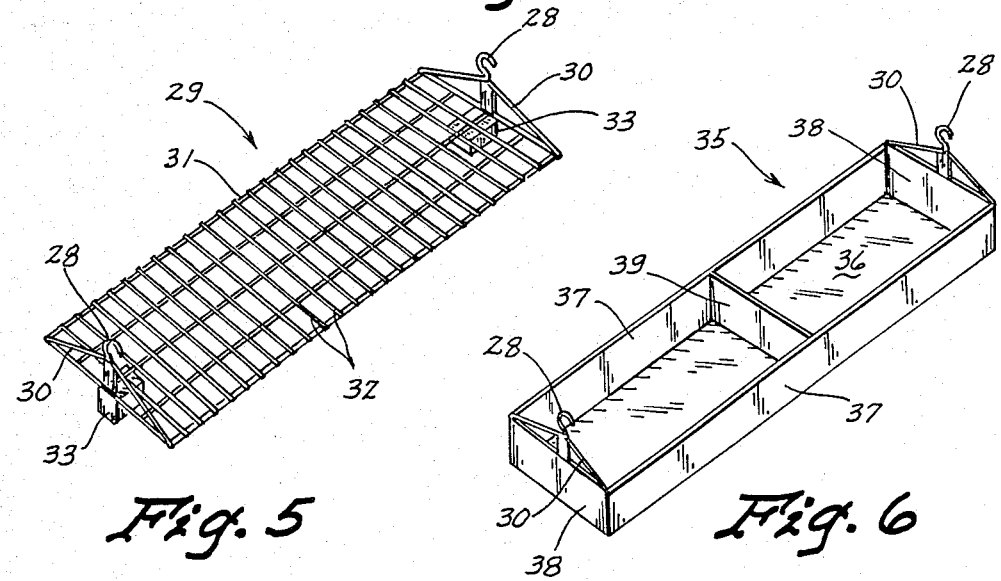
FIG. 5 is a perspective view of a grill apparatus constructed in accordance with the present invention.
FIG. 6 is a perspective view of a casserole pan constructed in accordance with the present invention.

Referring to FIG. 5, it is noted that the triangular shaped members (30), which are formed in one piece with the hooks (28), have longitudinal members (31) and cross members (32) welded together to form a grill which will support meat or other food to be cooked, but will allow grease to pass down therethrough in the spaces between the members (31) and (32).

Metal weights (33), in conjunction with the fact that the grill and weights (33) hang down a substantial distance from the hooks (28) and pins (27), automatically keep the grill members (31) and (32) in a horizontal orientation as shown in FIG. 3 by the weight of gravity acting thereon. This will prevent the food from falling off of the grill (29).

The grill assembly (29) can easily be taken off of the pins (27) and replaced by a casserole pan (35) or the like as is shown in FIG. 6. The casserole pan (35) has a solid bottom (36), solid sides (37), solid ends (38) and a solid partition (39). Because of the weight of the casserole pan (35), no separate weights (33) are necessary in order to maintain the casserole pan (35) in the orientation shown in FIG. 3, wherein the bottom (36) is always horizontal regardless of where it is during the rotation of the shaft (32) about its axis.

In operation, the gas barbeque grill (10) as shown in FIG. 1, would be hooked up in a normal fashion wherein a propane tank (40) has a hose (41) leading to a burner assembly (42) which, when lit, can produce a flame (33) extending out of orifices (44) in the pipe (45). One or more valves (not shown) control the flow from the tank (40) to the pipe (45).

Figure 2:
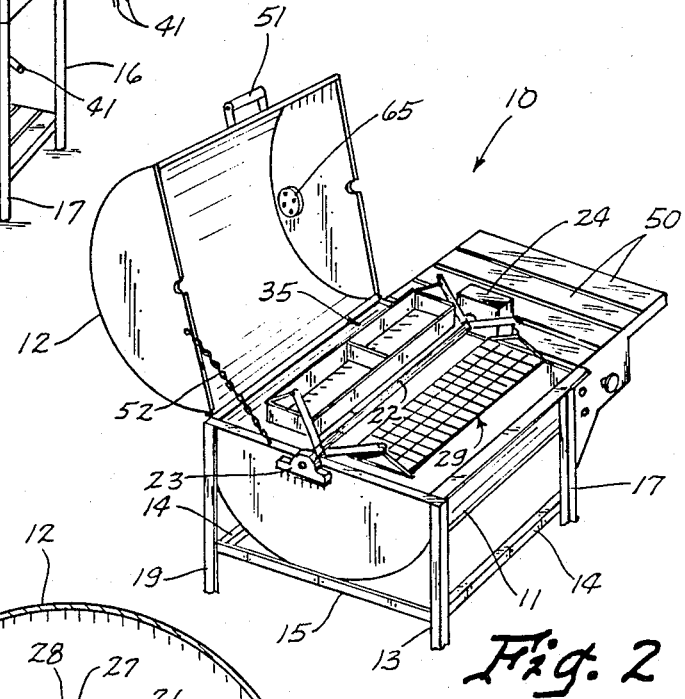
FIG. 2 is an enlarged perspective view with the lid open.

Meat or other food to be prepared can be placed on a plate or tray (50) and a handle (51) can be grasp to lift the lid (12) from the position shown in FIG. 1 to the position shown in FIG. 2. Then the food can be transferred onto the grill assemblies (29) or into the casserole tray (35). The burner assembly (42) can then be lit and the motor (24) turned on to cause the shaft (22) to rotate, preferably at about two revolutions per minute.

A chain (52) is connected at one end to the container (11) and at the other end to the lid (12) to keep it from going open too far. The lid (12) would be closed after the burner (42) is lit and the motor is activated to cause the assembly, shown in FIG. 3, to rotate in one direction.

As the food cooks, grease from the meat will drip down from the grill assemblies (29). The grease which drips down into the cavity formed by rectangular shaped walls (55), (56) and (57) will drip out through a hole (58) in wall (56) and into a grease catching container (59) connected to the leg (19). This will prevent the collection of grease in the area of the burner which might otherwise ignite and burn the food.

The grease which drips down in the rest of the container (11), especially from the point (60) to the left therefrom as shown in FIG. 3, will drain down to the bottom (61) of the container (11) and will drip out another drain opening (62) and into a grease catching container (63). The grease which accumulates does near the opening (62) will be a substantial distance from the flame (43) of burner (42), which will prevent the grease from igniting before it drips down into the container (63).

Accordingly, greasy foods such as spareribs, chicken and hamburger have very little chance of burning because the grease will not catch on fire and because there is substantially a constant temperature, as indicated by the thermometer (65), shown in FIGS. 1 and 2, as compared to a regular barbeque grill having the fire directly under the food which can ignite grease. The flame (43) is never directly under the grills for any extended period of time, but instead they are constantly moving in a 360° arc. This prevents burning of the food as well.

Entire meals can be prepared using interchangeable grill assemblies (29) and casserole pans (35). This eliminates the need to mess up a kitchen since everything can be cooked on the barbeque grill (10). If the food has finished cooking but there is a desire to wait before eating the food, the burner (42) can be turned down or off as needed and the food can be kept at a warm temperature suitable for serving when the meal is ready to be eaten.

Accordingly it will be appreciated that the preferred embodiment shown herein does accomplish the aforementioned objects. Obviously many modifications and variations of the present invention are possible in light of the above teachings. It is therefore to be understood that, within the scope of the appended claims, the invention may be practiced otherwise than as specifically described.

I claim:

1. A barbeque grill apparatus comprising:
   a container having a curved bottom, two sides connected to said bottom and two ends interconnecting the bottom and the sides, the lowest portion of the bottom being near the center thereof;
   a shaft operably rotatably attached to a top portion of said container;
   means for selectively automatically rotating said shaft; at least one arm attached at one end thereof to said shaft and extending radially outwardly therefrom;
   a grill means for receiving food to be cooked thereon, said grill means having openings therethrough for allowing liquids such as grease to pass therethrough;
   means for pivotally mounting said grill means to said arm;
   orientation means for causing said grill means to constantly pivot with respect to said shaft while said shaft is rotating to maintain a substantially horizontal orientation regardless of the rotative position of said shaft and arm;
   heating means for supporting combustion;
   said heating means being disposed substantially to one side of the center of the bottom of said container whereby grease flowing by gravity close to or at said center will not be close enough to the heating means to cause said grease to ignite;
   combustion chamber means disposed to one side of said heating means and along one side of said container for partially enclosing the underside of said heating means; and
   drain means disposed in the bottom of said combustion chamber means for allowing grease to drain therethrough.

2. The apparatus of claim 1 including an opening near the center of the bottom of the container to flow by gravity and through said opening.

3. The apparatus of claim 1 including a plurality of other arms extending radially from said shaft and a plurality of other grill means attached to respective ones of said other arms, each of said grill means having an associated means for pivotally mounting said respective grill means and an associated orientation means for causing said respective grill means to constantly pivot to maintain a substantially horizontal orientation while said shaft is rotating.

4. The apparatus of claim 3 wherein one of said grill means includes a solid basket having a sealed bottom for holding casseroles or the like.

5. The apparatus of claim 1 wherein said orientation means includes a frame disposed above said grill and connected to the bottom of said pivoting means; and weight means connected to the middle of the bottom of the grill means.

6. The apparatus of claim 1 including cover means for selectively covering or uncovering the top of said container.

* * * * *